(12) United States Patent
Takahashi

(10) Patent No.: US 10,414,210 B2
(45) Date of Patent: Sep. 17, 2019

(54) PNEUMATIC TIRE

(71) Applicant: TOYO TIRE & RUBBER CO., LTD., Osaka-shi, Osaka (JP)

(72) Inventor: Soichi Takahashi, Osaka (JP)

(73) Assignee: TOYO TIRE CORPORATION, Itami-shi, Hyogo (JP)

( * ) Notice: Subject to any disclaimer, the term of this patent is extended or adjusted under 35 U.S.C. 154(b) by 314 days.

(21) Appl. No.: 15/353,061

(22) Filed: Nov. 16, 2016

(65) Prior Publication Data

US 2017/0136825 A1    May 18, 2017

(30) Foreign Application Priority Data

Nov. 18, 2015    (JP) ................................. 2015-225680

(51) Int. Cl.
*B60C 11/03* (2006.01)
*B60C 11/00* (2006.01)
*B60C 11/12* (2006.01)

(52) U.S. Cl.
CPC .......... *B60C 11/03* (2013.01); *B60C 11/0083* (2013.01); *B60C 11/0306* (2013.01);
(Continued)

(58) Field of Classification Search
CPC ................. B60C 11/03; B60C 11/0306; B60C 2011/0365; B60C 11/0083;
(Continued)

(56) References Cited

U.S. PATENT DOCUMENTS

2016/0009141 A1*  1/2016  Suga .................... B60C 11/0083
                                                             152/209.9
2016/0280012 A1*  9/2016  Uchida ............... B60C 11/0083
(Continued)

FOREIGN PATENT DOCUMENTS

JP    6-48117    *   2/1994
JP    6-48117 A       2/1994
(Continued)

OTHER PUBLICATIONS

Office Action dated May 21, 2018, issued in counterpart Chinese application No. 201611025731.7, with English translation. (8 pages).

*Primary Examiner* — Eric Hug
(74) *Attorney, Agent, or Firm* — Westerman, Hattori, Daniels & Adrian, LLP

(57) ABSTRACT

An inner end (27a) of a slit (27) provided in a shoulder rib (25) in a tire width direction is terminated within the shoulder rib (25). The shoulder rib (25) includes a slit region (30) that has the slit (27) and a rib region (31) that has not the slit (27). The shoulder rib (25) protrudes to the outside of a tire reference profile line L on a cross-section in the tire width direction and has a protrusion peak (33) in the rib region (31). A ground contact surface of the shoulder rib (25) draw, on a cross-section in the tire width direction, an arch (M) passing through a ground contact end (22), the protrusion peak (33), and a point (34) on an inner sidewall of a shoulder-side main groove (21) in the tire width direction. The arch (M) passes through a point (35) on the tire reference profile line (L) or outside the tire reference profile line (L) in a normal direction of the tire reference profile line (L) at an inner end of the shoulder rib (25) in the tire width direction.

4 Claims, 2 Drawing Sheets

(52) U.S. Cl.
CPC ......... *B60C 11/12* (2013.01); *B60C 2011/039* (2013.01); *B60C 2011/0365* (2013.01); *B60C 2011/0381* (2013.01); *B60C 2011/0386* (2013.01); *B60C 2011/0395* (2013.01)

(58) Field of Classification Search
CPC ..... B60C 2011/0386; B60C 2011/0381; B60C 11/0309; B60C 2011/0369; B60C 2011/039; B60C 2011/0393; B60C 2011/0395
USPC ........................................ 152/209.15, 209.16
See application file for complete search history.

(56) References Cited

U.S. PATENT DOCUMENTS

2017/0129286 A1\* 5/2017 Kawakami .......... B60C 11/0008
2017/0297377 A1\* 10/2017 Honda ................ B60C 11/0304

FOREIGN PATENT DOCUMENTS

| JP | 2003-118317 A | 4/2003 | | |
|---|---|---|---|---|
| JP | 2006-168638 A | 6/2006 | | |
| JP | 2007-331439 A | 12/2007 | | |
| JP | 2012-1129 A | 1/2012 | | |
| WO | WO 2015/068605 | \* | 5/2015 | ......... B60C 11/0083 |

\* cited by examiner

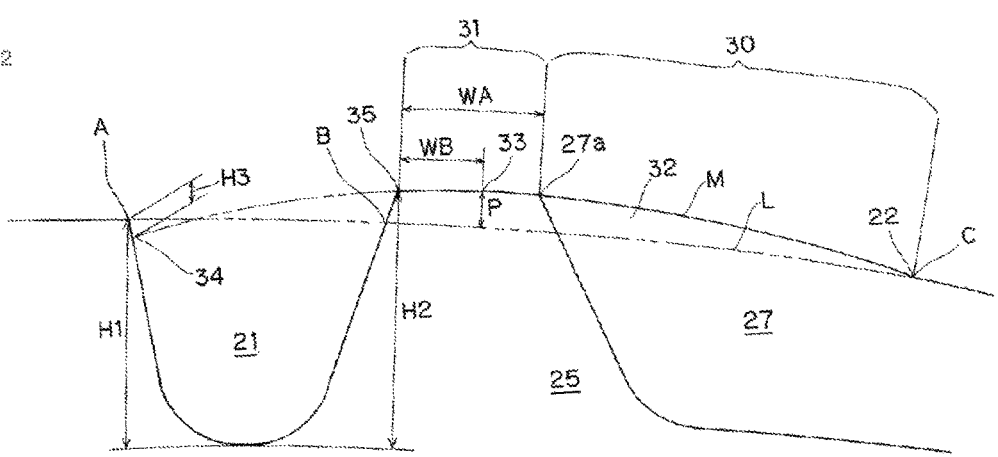

PNEUMATIC TIRE

CROSS-REFERENCE TO RELATED APPLICATIONS

This application is based on and claims priority from Japanese Patent Application No. 2015-225680 (filed Nov. 18, 2015). The present application incorporates Japanese Patent Application No. 2015-225680 by reference in its entirety.

TECHNICAL FIELD

The present invention relates to a pneumatic tire.

BACKGROUND ART

A pneumatic tire, in which plural main grooves extending in a tire circumferential direction are formed in a tread and plural parallel ribs are formed by the main grooves in a tire width direction, has a small rolling resistance and is favored in general. However, such a pneumatic tire has a problem in that a so-called shoulder rib on an outer side of the tire in the tire width direction hardly comes into contact with the ground and a ground contact pressure of the shoulder rib tends to be non-uniform. When the ground contact pressure of the shoulder rib is not uniform, a braking performance may not be sufficiently exhibited.

In addition, in a pneumatic tire in which plural slits extending in the tire width direction are formed in the shoulder rib, it has been known that the inner ends of the slits in the tire width direction are terminated in the shoulder rib or the inner portions of these slits are so narrow as to be closed during the ground contact. When such a pneumatic tire is inflated, the inner portion of the shoulder rib in the tire width direction is hardly inflated and the outer portion of the shoulder rib in the tire width direction is likely to be inflated. Thus, the ground contact pressure within the shoulder rib tends to be non-uniform.

In this regard, as described in Japanese Unexamined Patent Publication No. 2006-168638, a pneumatic tire has been suggested, in which the entire portion of a shoulder rib (shoulder region) is made to protrude to the outside of a tire reference profile line of a center rib (center region) in a tire radial direction. In such a pneumatic tire, a shoulder rib and a center rib are brought into contact with the ground under substantially the seine ground contact pressures.

DISCLOSURE OF THE INVENTION

However, even if the entire portion of the shoulder rib is made to protrude uniformly to the outside of the tire reference profile line in the tire radial direction, a portion of the shoulder rib, which is hardly inflated when the tire is inflated, is hardly brought into contact with the ground and the non-uniformity in ground contact pressure is not addressed.

The present invention has been made in consideration of the foregoing circumstances, and, in a pneumatic tire in which an inner end of a slit of a shoulder rib in a tire width direction is terminated within a shoulder rib or a pneumatic tire in which an end of a slit of a shoulder rib in the tire width direction, which is opened towards a ground contact surface, is closed during ground contact, the present invention is to provide a pneumatic tire in which a ground contact pressure becomes uniform within the shoulder rib.

A pneumatic tire according to an exemplary embodiment of the present invention includes: plural main grooves provided to extend in a tire circumferential direction; a shoulder rib provided between an outermost shoulder-side main groove in the tire width direction among the plural main grooves and a ground contact end; and plural slits provided on the shoulder rib to extend in a tire width direction, inner ends of the slits in the tire width direction being terminated within the shoulder rib at least during ground contact. The shoulder rib includes a slit region where slits are opened towards a ground contact surface in the tire width direction even during the ground contact and a rib region inside the slit region in the tire width direction. The shoulder rib protrudes, on a cross-section in the tire width direction, to the outside of a tire reference profile line in a normal direction of the tire reference profile line and has a protrusion peak in the rib region. A ground contact surface of the protruded shoulder rib draws, on a cross-section in the tire width direction, an arch that passes through the ground contact end, the protrusion peak, and a point on an inner sidewall of the shoulder groove in the tire width direction. The arch passes a point on the tire reference profile line or outside the tire reference profile line in the normal direction of the tire reference profile line at an inner end of the shoulder rib in the tire width direction.

In the pneumatic tire according to the exemplary embodiment, the ground contact pressure of the shoulder rib becomes uniform.

BRIEF DESCRIPTION OF THE DRAWINGS

FIG. 2 is a sectional view of a portion near a shoulder rib in a tire width direction in the tread pattern of the pneumatic tire of the exemplary embodiment.

BEST MODE FOR CARRYING OUT THE INVENTION

Figure 1:
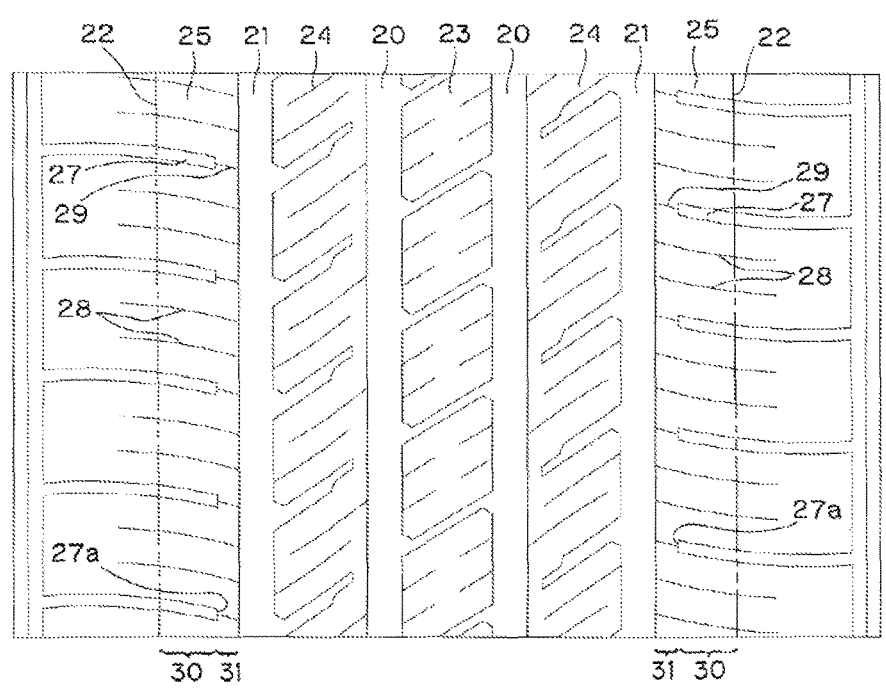
FIG. 1 is a view illustrating a tread pattern of a pneumatic tire of an exemplary embodiment.

The pneumatic tire according to an exemplary embodiment will be described with reference to the drawings. The drawings may be exaggerated for illustrative purposes.

The pneumatic tire according to the exemplary embodiment has the same cross-sectional structure as a conventional one, except for a tread. The pneumatic tire has a pair of bead portions on the opposite sides in the tire width direction. Each of the bead portions includes a bead core in which a bundle of steel wires is coated with rubber and a bead filler that is a rubber member provided outside the bead core in the tire radial direction. In addition, the pneumatic tire also includes a carcass ply that forms a tire skeleton between the pair of bead portions. The carcass ply is formed in a sheet-like shape in which plural ply cords aligned in parallel are coated with rubber. Outside the carcass ply in the tire radial direction, plural belts are stacked. The belts are formed in a sheet-like shape in which plural cords aligned in parallel are coated with rubber. In addition, a belt enhancement layer is also provided outside the belts in the tire radial direction, and a rubber-made tread is provided outside the belt enhancement layer in the tire radial direction. The surface of the tread is a ground contact surface. An inner liner is provided inside the carcass ply in the tire. Sidewalls are formed at the opposite sides of the carcass ply in the tire width direction. On the opposite sides of the carcass ply in the tire width direction, a rubber chafer is provided at a position corresponding to the outside of the bead portion in the tire width direction. The upper portion of the rubber chafer is in contact with the lower portion of each of the sidewalls, respectively. A rim is in contact with the surface of the rubber chafer.

A tread pattern of the present exemplary embodiment is illustrated in FIG. 1. In the present exemplary embodiment, four (4) main grooves extending in the tire circumferential direction are formed. Among the four main grooves, two (2) grooves formed at the inner sides in the tire width direction are center-side main grooves 20, and two (2) grooves formed at the outer sides in the tire width direction are shoulder-side main grooves 21. Plural land portions are formed which are separated from each other by the main grooves and extend in the tire circumferential direction. The land portion sandwiched between the two center-side main grooves 20 is a center land portion 23 that has a tire equator. The land portions sandwiched between the center-side main grooves 20 and the shoulder-side grooves 21 at the opposite sides of the center land portion 23 in the tire width direction are mediate ribs 24, respectively. The land portions switched between the shoulder main grooves 21 and ground contact ends 22 outside the mediate ribs 24 in the tire width direction are shoulder ribs 25, respectively.

Herein, the ground contact ends 22 refer to the ends of the ground contact surface in the tire width direction in the state in which a pneumatic tire is rim-assembled with a standard rim and reaches a normal internal pressure to be applied with a normal load. The standard rim refers to a standard rim defined in the specifications, such as JATMA, TRA, and ETRTO. In addition, the normal load refers to the maximum load defined in these specifications. Further, the normal internal pressure refers to an internal pressure corresponding to the maximum load.

The shoulder ribs 25 are provided with plural slits 27 at regular intervals in the tire circumferential direction. The slits 27 extend from the outside in the tire width direction and are terminated within the shoulder ribs 25. Although the slits 27 extend in the tire width direction, the slits may be oblique to the tire width direction or may be bent at the intermediate portions thereof. The inner ends 27a of the slits 27 in the tire width direction are located within a corresponding one of the shoulder ribs 25. Further, the slits 27 are opened outward from a corresponding one of the ground contact ends 22 in the tire width direction.

A narrow groove 29 is provided continuously from the inner end 27a of each of the slits 27 in the tire width direction to the inner end of a corresponding one of the shoulder ribs 25 in the tire width direction. The narrow groove 29 is opened towards the shoulder-side main groove 21. The width of the narrow grooves 29 is smaller than the width of the slits 27, and is, for example, 1.5 mm or less. The ends of the narrow grooves 29, which are opened towards the ground contact surface, are closed during the ground contact. However, the ends of the slits 27, which are opened towards the ground contact surface, are opened even during the ground contact. Here, "during the ground contact" refers to a period in which a pneumatic tire is rim-assembled with a standard rim and reaches a normal internal pressure to be applied with a normal load.

In the exemplary embodiment illustrated in FIG. 1, plural narrow grooves 28 are also provided in addition to the slits 27 and the narrow grooves 29. The ends of the narrow grooves, which are opened towards the ground contact surface, are closed during the ground contact. The narrow grooves 28 are opened towards a corresponding one of the shoulder-side main grooves 21 and are terminated within the shoulder rib 25. The narrow grooves 28 have a width in a range of, for example, 1.0 mm to 1.5 mm.

Each of the shoulder rib 25 has two regions separated from each other in the tire width direction. The two regions refer to a slit region 30 in which the slits 27 are provided, and a rib region 31 inside the slit region 30 in the tire width direction. The slit region 30 in the tire width direction covers from the inner ends 27a of the slits 27 in the tire width direction to the ground contact end 22. The rib region 31 in the tire width direction covers from an inner end of the shoulder rib 25 in the tire width direction to the inner ends 27a of the slits 27 in the tire width direction.

Since the slits 27 are opened towards the ground contact surface even during the ground contact, the slit region 30 is divided by the slits 27 even during the ground contact not to continuously extend in the tire circumferential direction. While the narrow grooves 29 continued from the slits 27 or the narrow grooves 28 separated from the slits 27 exist in the rib region 31, the ends of such narrow grooves, which are opened towards the ground contact surface, are closed during the ground contact. Therefore, the rib region 31 is continuous in the tire circumferential direction without being divided by, for example, the grooves at least during the ground contact. Also, when the pneumatic tire as inflated, the slit region 30 is much inflated and the rib region 31 is less inflated than the slit region 30.

FIG. 2 illustrates a cross-section of the tread in the tire width direction near a shoulder rib 25. The shoulder rib 25 protrudes to the outside of a tire reference profile line L in the normal direction of the tire reference profile line L. The tire reference profile line L refers to an arch line on the shoulder rib 25, which passes through three points A, B, and C on the cross-section in the tire width direction. Point A at the inner side in the tire width direction is a point where the inner sidewall of the shoulder-side main groove 21 in the tire width direction and the ground contact surface of a mediate rib 24 intersect. In other words, Point A is a point at an outer end of the ground contact surface of the mediate rib 24 in the tire with direction. Pont B next to Point A is a point on the outer sidewall of a shoulder-side main groove 21 in the tire width direction where the height from the bottom of the shoulder-side main groove 21 becomes equal to H1, which is the height of the inner sidewall of the shoulder-side main groove 21 in the tire width direction (i.e., the height of Point A from the bottom of the shoulder-side main groove 21). Point C at the outer side in the tire width direction is a point on the ground contact end 22. Here, a height of a point from the groove bottom and a height of the sidewall of the shoulder-side main groove 21 refer to a height from the bottom of the shoulder-side main groove 21 in the normal direction.

As described above, the shoulder rib 25 protrudes to the outside of the tire reference profile line L in the normal direction of the tire reference profile line L. A portion protruding to the outside of the tire reference profile line L is referred to as a protrusion 32. The protrusion 32 has a protrusion peak 33 in the rib region 31. The protrusion peak 33 is a point at a portion protruding highest from the tire reference profile line L in the normal direction of the tire reference profile line L. The height P may be $0.2 \text{ mm} \leq P \leq 1.0$ mm.

The surface of the protrusion 32 draws an arch M on the cross-section in the tire width direction. The arch M passes through the ground contact end 22, the protrusion peak 33, and a point 34 on the inner sidewall of the shoulder-side main groove 21 in the tire width direction. The point 34 is located at any portion on the inner sidewall of the shoulder-side main groove 21 in the tire width direction. The point 34 may overlap with Point A on the ground contact surface or may be positioned inward by a length H3 from the ground contact surface in the tire radial direction as illustrated in FIG. 2. The arch M including he point 34 passes above the tire reference profile line L at the inner end of the shoulder rib 25 in the tire width direction, or passes outside the tire reference profile line L in the normal direction of the tire reference profile line L as illustrated in FIG. 2. In other words, H2, i.e., the height of the outer sidewall of the shoulder-side main groove 21 in the tire width direction (i.e., the height from the bottom of the shoulder-side main groove 21 at the inner end of the shoulder rib 25 in the tire width direction) is higher than H1, i.e., the height of the inner sidewall of the shoulder-side main groove 21 in the tire width direction (i.e., the height from the bottom of the shoulder-side main groove 21 at the outer end of the mediate rib 24 in the tire width direction). In order for the surface of the protrusion 32 to draw this arch M, the entire shoulder rib 25 covering from the inner end of the shoulder rib 25 to the ground contact end 22 in the tire width direction protrudes to the outside of the tire reference profile line L in the normal direction of the tire reference profile line L.

The protrusion peak 33 may be present in the vicinity of the center of the rib region 31 in the tire width direction. Specifically, it is assumed that the length of the rib region 31 along the arch M, i.e., the length extending along the arch M from the inner end 35 of the ground contact surface of the shoulder rib 25 in the tire width direction to the inner end 27a of the slit 27 in the tire width direction, is WA. In addition, it is assumed that the length extending along the arch M from the inner end 35 of the ground contact surface of the shoulder rib 25 in the tire width direction to the protrusion peak 33 is WB. In that case, the relationship between WA and WB may be represented as 0.3WA≤WB≤0.7WA.

In the pneumatic tire having a structure as described above, since the entire shoulder rib 25 protrudes to the outside of the tire reference profile line L in the normal direction of the tire reference profile line L, the shoulder rib 25 exhibits a good ground contact property. In particular, since the entire ground contact surface of the shoulder rib 25 draws one arch M on the cross-section in the tire width direction, portions where the ground contact pressure discontinuously increases or decreases hardly occur in the protrusion 32 and the ground contact pressure of the shoulder rib 25 becomes uniform. Further, since the protrusion peak 33 is provided in the rib region 31, the entire surface of the shoulder rib 25 eventually has a satisfactory shape even if the slit region 30 is much inflated and the rib region 31 is relatively less inflated when the pneumatic tire is inflated. Therefore, the ground contact pressure in the shoulder rib 25 becomes uniform and the braking performance of the pneumatic tire is improved. In addition, since the shoulder rib 25 merely protrudes to the outside of the tire reference profile line L, rolling resistance is unlikely to extremely deteriorate by reasons, such as a great increase in the weight of the pneumatic tire.

Also, when the height P of the peak 33 of the protrusion 32 from the tire reference profile line L is 0.2 mm or greater, the effect of protrusion can be sufficiently obtained. When the height P is 1.0 mm or less, it is possible to prevent only the ground contact pressure of the peak 33 of the protrusion 32 from increasing.

On the arch M representing the surface of the protrusion 32, when the length WA of the rib region 31 and the length WB extending between the inner end 35 of the ground contact surface of the shoulder rib 25 in the tire width direction and the peak 33 of the protrusion 32 have a relationship represented by 0.3WA≤WB≤0.7WA, the ground contact pressure is not unequally distributed in the rib region 31 and also becomes uniform over the entire shoulder rib 25.

With respect to the present exemplary embodiment, various modifications, substitutions, or omissions may be made without departing from the gist of the invention.

First, the slits 27 may be terminated within a corresponding shoulder rib 25 at least during the ground contact. Thus, the slits 27 may be terminated within the corresponding shoulder rib 25 even in the state of being out of the ground contact. In other words, the narrow grooves 29 continued from the slits 27 in the exemplary embodiment above may not exist.

Further, in the slits provided in a shoulder rib 25, a slit, which is opened towards the ground contact surface even during the ground contact, may be terminated at the opposite ends in the tire width direction within the shoulder rib 25. In this case, a region where slits are opened towards the ground contact surface in the tire width direction during the ground contact is also referred to as a slit region, and a region inside the slit region in the tire width direction is also referred to as a rib region. Also, a protrusion peak of the shoulder rib 25 is present in the rib region.

In addition, two or more different types of slits may be provided in the shoulder rib 25. In this case, a region where slits are opened towards the ground contact surface in the tire width direction during ground contact is also referred to as a slit region, and a region inside the slit region in the tire width direction is also referred to as a rib region. Also, a protrusion peak of the shoulder rib 25 shall be present in the rib region.

The number of main grooves is not limited to four (4). Plural main grooves may be formed such that at least a shoulder rib sandwiched between the outermost main groove in the tire width direction and the ground contact end and a land portion inside the shoulder rib in the tire width direction are formed.

The rolling resistance and the braking performance of pneumatic tires in the examples and comparative examples in Table 1 were evaluated. All of the pneumatic tires according to the examples and comparative examples have four (4) main grooves and five (5) land portions, and also have slits similar to the slits 27 in the shoulder ribs thereof. In Table 1, H1, H2, H3, WA, NB, and P indicate the respective lengths of the portions corresponding to the portions indicated by H1, H2, H3, WA, NB and P in FIG. 2 with respect to the pneumatic tires according to the examples and the comparative examples. In other words, H1 indicates the height of the inner sidewall of the shoulder-side main groove in the tire with direction, H2 indicates the height of the outer sidewall of the shoulder-side main groove in the tire width direction, H3 indicates the length of a point, at which the arch defining the surface of the protrusion and the inner sidewall of the shoulder-side main groove in the tire width direction intersect, from the ground contact surface, WA indicates the length of the shoulder rib from the inner en of the ground contact surface in the tire width direction to the inner end of the slit in the tire width direction, WB indicates a length of the ground contact surface of the shoulder rib from the inner end to the protrusion peak the tire width direction, and P indicates the height of the protrusion peak from the tire reference profile line L.

The pneumatic tire according to Comparative Example 1 is a pneumatic tire that does not have a protrusion in the shoulder ribs thereof. The pneumatic tire according to Comparative Example 2 is a pneumatic tire that includes a protrusion in the shoulder rib thereof in which H1 is larger than H2. In other words, the arch defining the surface of the shoulder rib on the cross-section in the tire width direction passes below the tire reference profile line L at the inner end of the shoulder rib in the tire width direction. In the pneumatic tires of Examples 1 and 2, the positions or heights P of the protrusion peaks are different from each other. Also, the size of every pneumatic tire is 195/65R15.

The evaluation method is as follows.

Rolling Resistance: the rolling resistance was measured using a rolling resistance tester in which the inner pressure of a pneumatic tire was set to 200 kPa, the rim size was set to 15×6 JJ, the load was set to 4.8 kN, and the speed was set to 80 km/h. In addition, the measurement results were indexed. Indexes were relativized assuming that the index of Comparative Example 1 is 100, which means that the smaller the index, the less the rolling resistance.

Braking Performance: While a vehicle equipped with pneumatic tires was running on a dry road surface at 100 km/h, an ABS was operated by applying braking force and the braking distance was measured to obtain the inverse number of the braking distance. In addition, the measurement results were indexed. The indexes were relativized assuming that the index of Comparative Example 1 is 100, which means that the larger the index value, the better the baking performance (dry performance).

The results of the evaluation are shown in Table 1. It has been confirmed that the pneumatic tires in Examples 1 and 2 are superior to those in Comparative Examples 1 and 2 in terms of baking performance, and are not poor even in terms of rolling resistance.

TABLE 1

|  | Comparative Example 1 | Comparative Example 2 | Example 1 | Example 2 |
| --- | --- | --- | --- | --- |
| H2−H1 (mm) | 0 | −0.2 | 0.2 | 0.2 |
| WA (mm) | — | 5 | 5 | 5 |
| WB (mm) | — | 4 | 2.5 | 4 |
| Radius of arch representing surface of protrusion on cross section in tire width direction (mm) | — | 55 | 100 | 75 |
| H3 (mm) | — | 1 | 0.1 | 0.5 |
| P (mm) | 0 | 0.1 | 0.2 | 0.4 |
| H1 (mm) | 7.5 | 7.5 | 7.5 | 7.5 |

TABLE 1-continued

|  | Comparative Example 1 | Comparative Example 2 | Example 1 | Example 2 |
| --- | --- | --- | --- | --- |
| Rolling Resistance | 100 | 102 | 99 | 99 |
| Braking Performance | 100 | 98 | 103 | 104 |

The invention claimed is:

1. A pneumatic tire comprising: a plurality of main grooves provided to extend in a tire circumferential direction; a shoulder rib provided between an outermost shoulder-side main groove in the tire width direction among the plurality of main grooves and a ground contact end; and a plurality of slits provided on the shoulder rib to extend in a tire width direction, inner ends of the slits in the tire width direction being terminated within the shoulder rib at least during ground contact, wherein the shoulder rib includes a slit region where slits are opened towards a ground contact surface in the tire width direction even during the ground contact and a rib region inside the slit region in the tire width direction, wherein the shoulder rib protrudes, on a cross-section in the tire width direction, to the outside of a tire reference profile line in a normal direction of the tire reference profile line and has a protrusion peak in the rib region, wherein a ground contact surface of the protruded shoulder rib draws, on a cross-section in the tire width direction, an arch that passes through the ground contact end, the protrusion peak, and a point on an inner sidewall of the shoulder-side main groove in the tire width direction, and wherein the arch passes a point on the tire reference profile line or outside the tire reference profile line in the normal direction of the tire reference profile line at an inner end of the shoulder rib in the tire width direction.

2. The pneumatic tire according to claim 1, wherein a height P of the peak of the protrusion from the tire reference profile line is 0.2 mm≤P≤1.0 mm.

3. The pneumatic tire according to claim 1, wherein a length WA of the rib region along the arch and a length WB extending along the arch from an inner end of she shoulder rib in the tire width direction to the protrusion peak have a relationship represented as 0.3WA≤WB≤0.7WA.

4. The pneumatic tire according to claim 2, wherein a length WA of the rib region along the arch and a length WB extending along the arch from an inner end of the shoulder rib in the tire width direction to the protrusion peak have a relationship represented as 0.3WA≤WB≤0.7WA.

* * * * *